United States Patent [19]

Labarre

[11] 3,841,815

[45] Oct. 15, 1974

[54] MACHINE FOR PRODUCING PERFORATED SLEEVES

[76] Inventor: Maurice Labarre, 5 bis Ave. Pierre Grenier, 92 Boulogne, France

[22] Filed: Nov. 30, 1972

[21] Appl. No.: 310,784

[30] Foreign Application Priority Data
Dec. 2, 1971 France .............................. 71.43207
Nov. 16, 1972 France .............................. 72.40691

[52] U.S. Cl. ................. 425/290, 425/311, 264/154, 425/325
[51] Int. Cl. ............................................ B29c 24/00
[58] Field of Search ........... 425/290, 291, 311, 313, 425/325, 326 R; 264/154

[56] References Cited
UNITED STATES PATENTS

| | | | |
|---|---|---|---|
| 1,369,522 | 2/1921 | Dochnal | 264/154 X |
| 3,086,246 | 4/1963 | Stone | 425/326 X |
| 3,714,310 | 1/1973 | Gaffney et al. | 264/154 X |

Primary Examiner—R. Spencer Annear
Attorney, Agent, or Firm—Robert E. Burns; Emmanuel J. Lobato; Bruce L. Adams

[57] ABSTRACT

A machine for producing a tubular perforated, in particular net-like, sleeve by the extrusion of plastics material, more particularly a thermoplastics material, of the type comprising a cylindrical annular-slot extrusion head for forming a solid-walled tubular sleeve, and means for forming in this tubular sleeve perforations which are subsequently enlarged by transverse and/or longitudinal drawing of the sleeve, wherein the perforation forming means are constituted by one or more toothed rollers rotatable about the axis of the die in such manner that the teeth of the roller or rollers penetrate through the wall of the tubular sleeve after it has issued through the said extrusion head.

27 Claims, 7 Drawing Figures

3,841,815

3,841,815

MACHINE FOR PRODUCING PERFORATED SLEEVES

BACKGROUND OF THE INVENTION

This invention relates to a machine for producing tubular perforated sleeves by extrusion of plastics material.

Prior Art

It has already been proposed to produce plastics net structures by means of a machine comprising a head for extruding a tubular sleeve which, after cooling, is passed across a substantially rectangular template surrounded by an assembly of four spiked cylinders which are rotated in such a way as to perforate the sleeve, which then passes through an assembly of drawing rollers to enlarge the perforations both in the longitudinal and in the transverse directions. However, this machine, in which a nozzle is used to inject a cooling fluid into the sleeve as it leaves the extrusion die, makes it necessary to split the sleeve after it has passed through the drawing rollers in order to allow the tube carrying the nozzle to pass through, with the result that the net-like product obtained is flat (U.S. Pat. No. 2,361,369).

It has also been proposed to produce tubular perforated structures by extruding a plastics material, the openings or perforations being obtained by blocking the passage of the plastics material at those points at which the perforations are to be formed, for example by means of members which periodically obstruct a flat extrusion die at certain places. However, the necessary opening and closing movement of these members, obtained by hydraulic means, considerably limits the rate of production.

OBJECT OF THE INVENTION

The machine according to the invention for producing a perforated, more particularly net-like, tubular sleeve by extruding a plastics material, especially a thermoplastic plastics material, enables these disadvantages to be obviated.

BRIEF SUMMARY OF THE INVENTION

The machine according to the invention is of the type which comprises a cylindrical annular-slot extrusion head for forming a solid-walled tubular sleeve, and rotatable perforating means for forming perforations in this sleeve to be enlarged by transverse and/or longitudinal drawing of the sleeve, and is essentially characterised by the fact that the afore-mentioned means consist of one or more toothed rollers rotated about the axis of the die in such a way that the teeth of the rollers penetrate through the wall of the tubular sleeve. The term "rollers" is to be interpreted in its broadest sense and includes short rollers in the form of wheels or discs.

FURTHER FEATURES OF THE INVENTION

In one preferred embodiment, the rollers are freely mounted on a support integral with a shaft journalled in the axis of the extrusion head and rotated from that end of the extrusion head opposite the end at which a template, over which the sleeve passes, is provided in known manner.

The aforementioned shaft is with advantage designed to be displaced axially in the extrusion head from a position in which the rollers are not in contact with the extruded sleeve into a position in which they penetrate through the sleeve issuing from the slot.

If desired, the rollers can be positively rotated about their respective axes from a transmission controlled from outside the extrusion head.

The rollers can be provided with identical peripheral teeth rectangular or pointed in shape, the arrangement being such that a roller with rectangular teeth may alternate with a roller having pointed teeth, although this order is by no means imperative.

The invention also relates to the product obtained by use of the machine described above.

BRIEF DESCRIPTION OF DRAWINGS

A preferred embodiment of a machine according to the invention is described by way of example in the following with reference to the accompanying drawings, wherein.

DESCRIPTION OF EMBODIMENT

Figure 1:
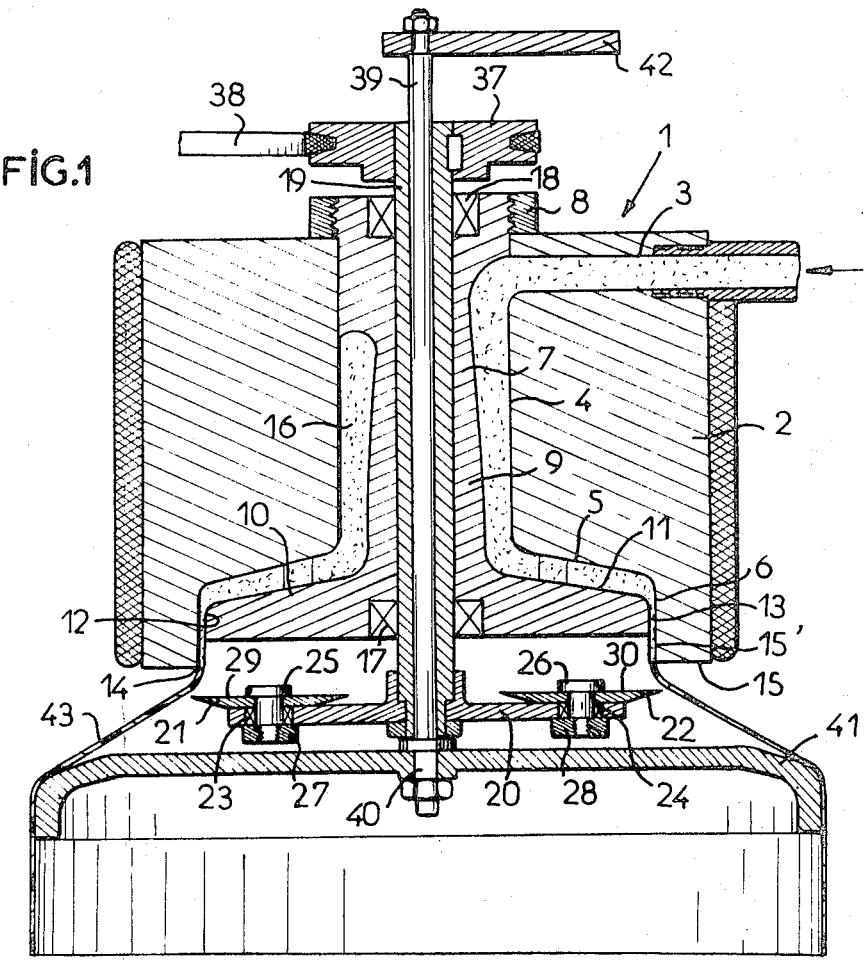
FIG. 1 is an axial section through the machine showing the rollers in their rest position.

As shown in FIG. 1, the machine according to the preferred embodiment of the invention consists essentially of an extrusion head generally denoted by the reference 1. This extrusion head is formed by a cylindrical block 2 provided with a lateral bore 3 adapted to be connected to a source of plastics material under pressure (not shown), such as an extruder. The cylindrical block 2 is provided with an axial bore 4 which widens conically downwards at 5 to terminate in a cylindrical bore whose wall is denoted by the reference 6. In the axial opening thus formed in the block 2, which has the general appearance of an inverted mushroom, there is mounted a central core 7 which is held in place by means of a nut 8 and whose central part 9 widens downwards into a shoulder 10 whose upper face 11 is located at a predetermined distance from the face 5 of the block 2 and whose cylindrical wall 12 forms, together with the wall 6 of the block 2, an annular extrusion slot which is denoted by the reference 13 and which opens through a ring 14 positioned at a recessed level on the front face 15 of the block 2, in order to leave a cylindrical face 15' at the bottom of the block 2 to guide the sleeve issuing from the slot 14.

The zone through which the plastics material flows from the pipe 3 to the annular slot 14 is denoted by the general reference 16.

Rotatable perforating means includes elements 17–36. A hollow shaft 19 extending beyond the extrusion head both at its upper end and at its lower end is journalled in the axis of the central core 7 by means of ball bearings 17 and 18. A plate 20 carrying a certain number of rollers uniformly distributed around its periphery is fixed to the lower end of the hollow shaft 19.

Each of the rollers such as those denoted by the references 21 and 22 is freely mounted by means of ball bearings 23, 24 on axles 25, 26 held in place by nuts 27, 28. Each of the rollers is in the form of a frustum whose major base 29, 30 is parallel to the front face 15 of the cylindrical block 2.

Figure 3:
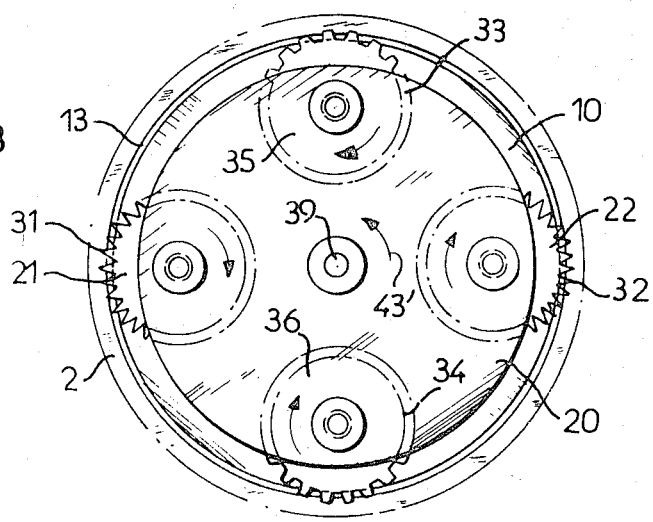
FIG. 3 is a diagrammatic view on the line III—III of FIG. 2.

Each roller, such as those denoted by the references 21 and 22, is provided around its periphery with teeth 31, 32 pointed or rectangular in shape, as shown by the teeth 33 and 34 in FIG. 3, which shows a plate 20 comprising, in addition to the rollers 21 and 22, two rollers 35 and 36.

Referring again to FIG. 1, it can be seen that a drive means in the form of a pulley 37 cooperating with a belt 38 is keyed to the hollow shaft 19, whilst a rod 39 extends through the hollow shaft 19, carrying a template 41 at its lower end 40, which extends beyond the hollow shaft 19. The rod 39 is permanently fixed at its upper end to a bracket 42 integral with a fixed part of the machine.

When the plastics material is introduced in the form of a paste into the machine as shown in FIG. 1 through the radial channel 3, it flows through the chamber 16 and the annular extrusion channel 13, issuing through the annular slot 14 in the form of a solid-walled tube 43 which passes over the template 41.

In use, the hollow shaft 19 is rotated at high speed, taking with it the plate 20 and the various rollers 21, 22 and 35, 36 for example in the direction of arrow 43', the hollow shaft 19 being lifted upwards by means (not shown).

When the aforementioned rollers reach a level at which their teeth begin to come into contact with the tubular wall 43, they begin by decelerating and then rotate in the opposite direction to the arrow 43', i.e. clockwise in FIG. 3, as indicated by the various arrows alongside the various rollers. If the hollow shaft 19 continues to be lifted, the various teeth 31 to 34 penetrate through the tubular wall 43 and the machine then reaches its working position, as shown in FIG. 2, although the faces 19 and 20 of the rollers must clearly not be in contact with the front face 15 of the block 2, to ensure that they are not slowed down by friction.

Figure 2:
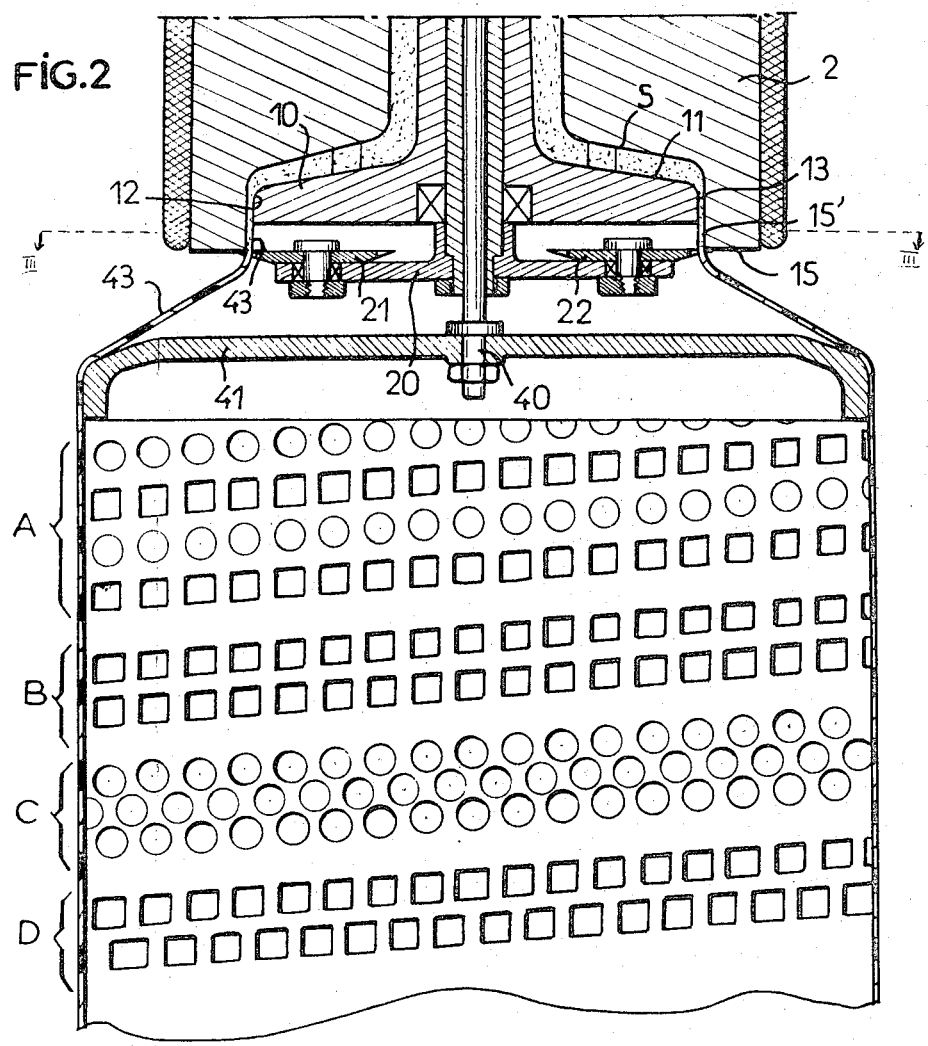
FIG. 2 shows the machine illustrated in FIG. 1 with the rollers in their working position.

When the components of the machine are in their respective positions as shown in FIGS. 2 and 3, each roller forms in the wall 43 perforations or openings aligned along a helical path, these openings subsequently being enlarged by the passage of the wall 43, perforated beforehand, over the template 41.

FIG. 3 shows rollers with rectangular teeth 35 and 36 alternating with rollers with pointed teeth 21 and 22. With an arrangement of this kind, lines of rectangular openings alternating with lines of circular openings are formed in the tubular wall.

It is of course also possible to provide only rollers with rectangular teeth on the plate 20, in which case the wall 43 is only perforated by rectangular openings which can be aligned along generatrices or staggered from one line to the other.

If only rollers with pointed teeth are provided, the openings will be round.

Various possible configurations (A. B, C, D) are shown by way of example in FIG. 2.

It is obvious that the intervals between the holes, that is to say the intermediate axes between the perforations, are variable on the one hand in dependence upon the velocity of the longitudinal traction applied to the wall 43 extruded through the slot 14, and on the other hand in dependence upon the rotational speed of the hollow shaft 19 and, hence, in dependence upon the rotational speed of the rollers.

In the embodiment described above, the rollers such as 21, 22 and 35, 36 are not positively driven.

Figure 4:
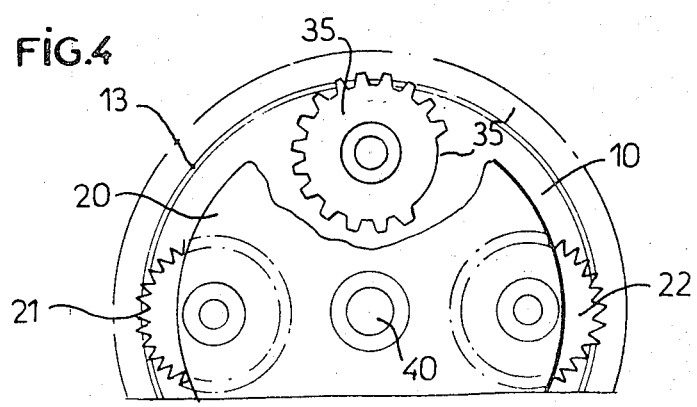
FIG. 4 is a variant of FIG. 3.

According to a modification, a pinion transmission is provided to enable these rollers to be driven positively from the rotation of the shaft 19 without having to modify the function of the machine in any way for this purpose, in addition to which one or other of the rollers, for example the roller 35 (FIG. 4), can be provided with a non-toothed zone 35' to leave an intact axial zone in the perforated sleeve.

The particular advantage of the machine according to the invention is embodied in the extremely high production rate which is made possible by virtue of the fact that the elements used to form the openings in the extruded sleeve 43 are rotating elements which are not subjected to any alternating or flapping movement.

Figure 5:
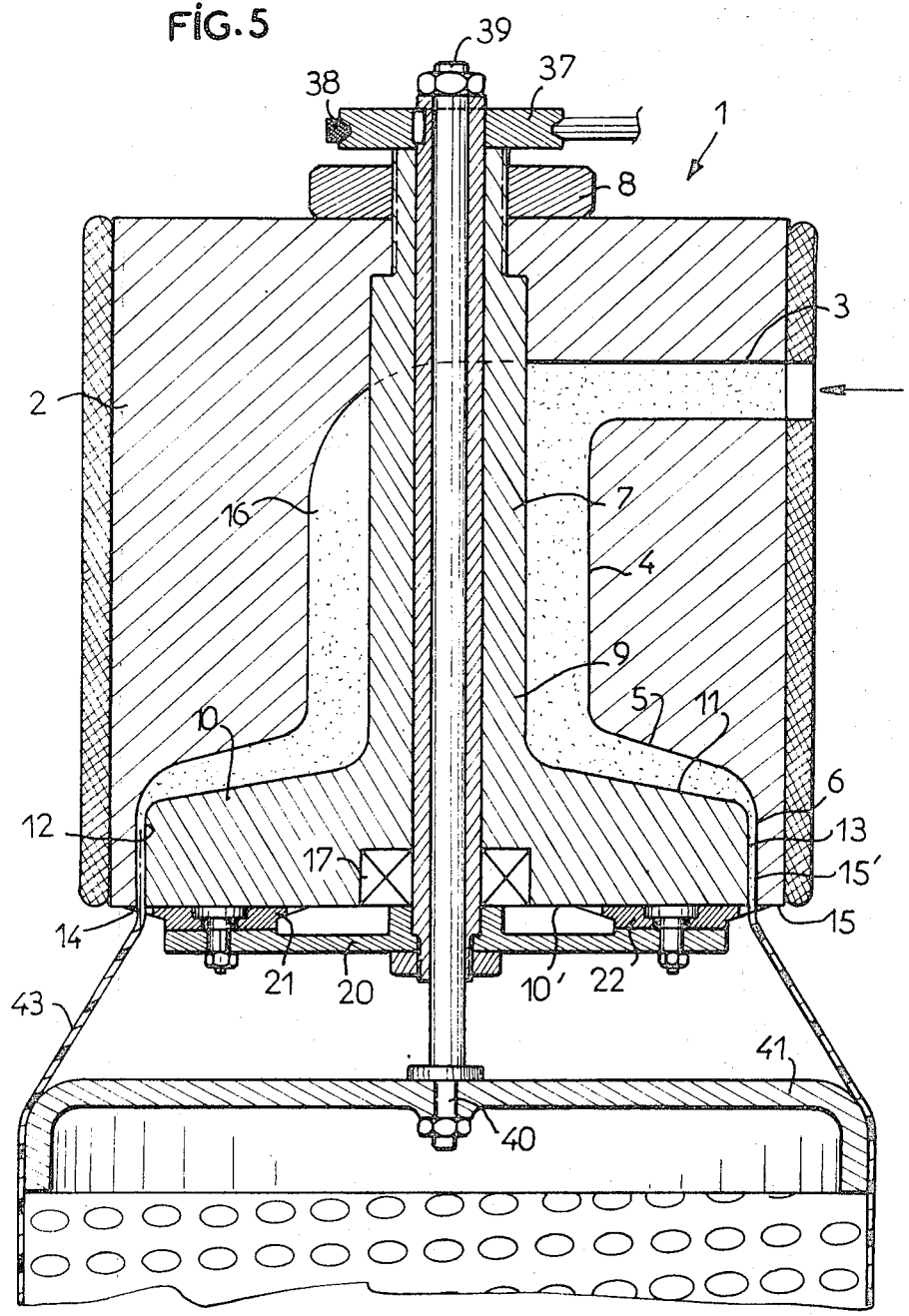
FIG. 5 is a section similar to FIG. 2 through a variant in which the teeth of the rollers extend through the extrusion slot.

The machine shown in FIG. 5 corresponds substantially to the machine shown in FIG. 2 and, in these two figures, the same components are denoted by the same references.

The main difference between these two embodiments is that the front face 15 of the cylindrical block 2 is situated at the same level as the front face 10' of the shoulder 10, and that the toothed wheels 21 and 22 are mounted on the plate 20 in such a way that the teeth 14 of the wheels, such as the wheel denoted by the reference 21, penetrate through the extruded sheet by only a few tenths of a millimetre so that they just perforate this sheet, which is obtained by extrusion through the annular slot defined by the two coaxial cylindrical faces 12 and 13 of the shoulder 10 and of the block 2, respectively.

By virtue of this arrangement, the perforations are made just as the tubular sleeve issues from the extrusion slot, and they are well-defined by virtue of the particular arrangement of the toothed wheels on the plate 20.

Figure 6:
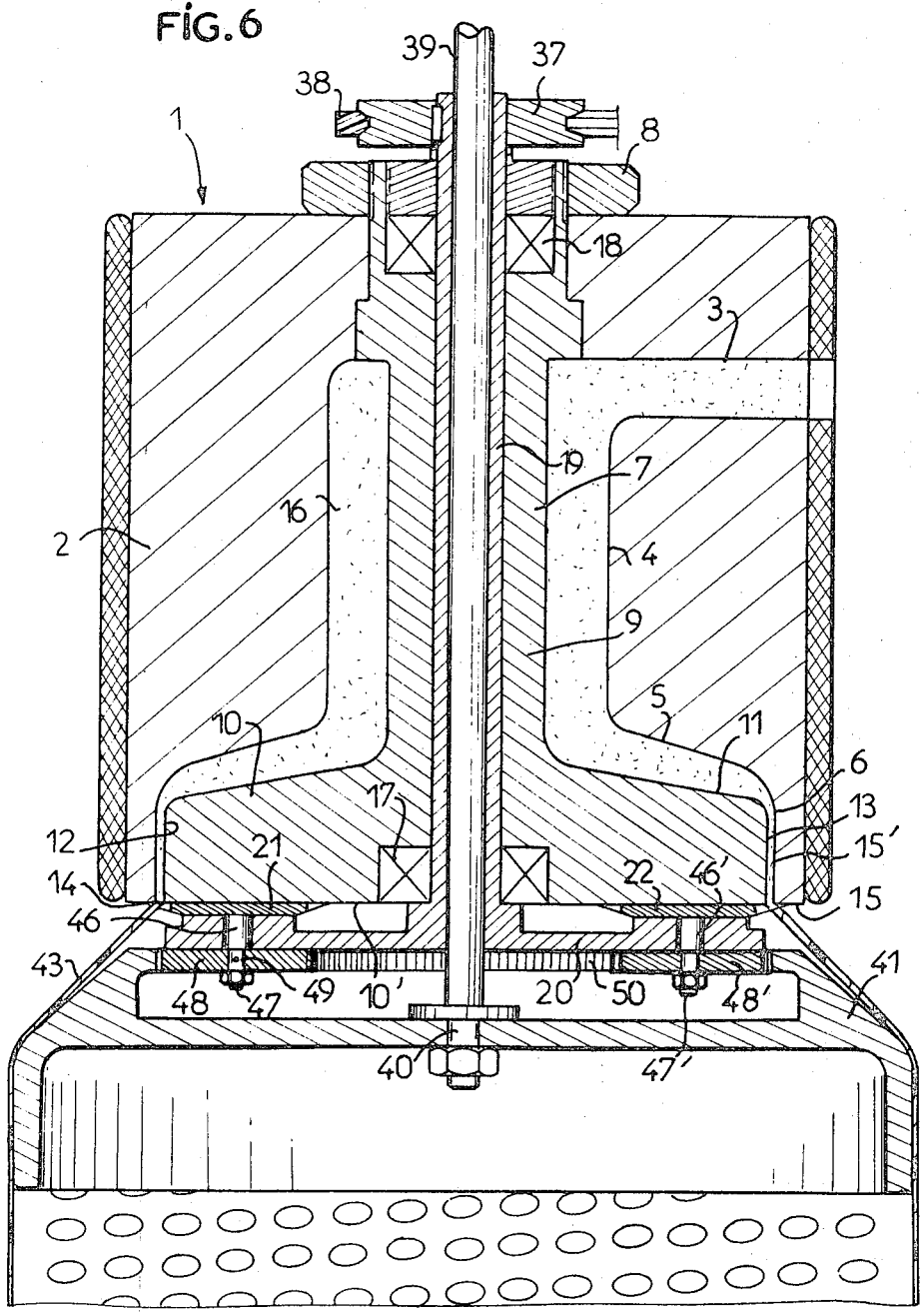
FIG. 6 is a diagrammatic axial section through an embodiment in which rotation of the toothed rollers or wheels about their own axes is positively controlled.

The extrusion head 1 of the embodiment shown in FIG. 6 is substantially identical with that shown in FIG. 1 and the same references have been used to denote the same components, although it should be noted that the front face 15 of the cylindrical block 2 is situated at the same level as the front face 10' of the shoulder 10, as described above with reference to FIG. 5, and that the toothed rollers 21 and 22 are shown in the working positions. In this embodiment the rotatable perforating means also includes elements 46–50 and 46' t0 48'.

The modification of the extrusion head 1 shown in FIG. 6 is essentially that each of the wheels 21 and 22, which are mounted for rotation on the plate 20, is carried by an axle 46, 46' whose stub 47, 47' extends through the plate 20 and carries a toothed pinion 48, 48' fixed to the axle by means of a pin 49. Each of these pinions such as 48, 48' meshes with a fixed toothed ring 50 shown in the drawing as being integral with the template 41, which is itself fixed to the bracket 42 of the machine frame through the rod 39.

In this embodiment, as in the embodiment shown in FIG. 5, the toothed wheels rotate about the axis 19 of the die, each rotating about its own axis with extreme precision by virtue of the fact that its toothed pinion meshes with the toothed ring which ensures that one and the same tooth of a wheel will always perforate the extruded sleeve in the same angular position. It is possible in this way to obtain extremely good vertical alignment of the openings formed in the tubular wall.

Figure 7:
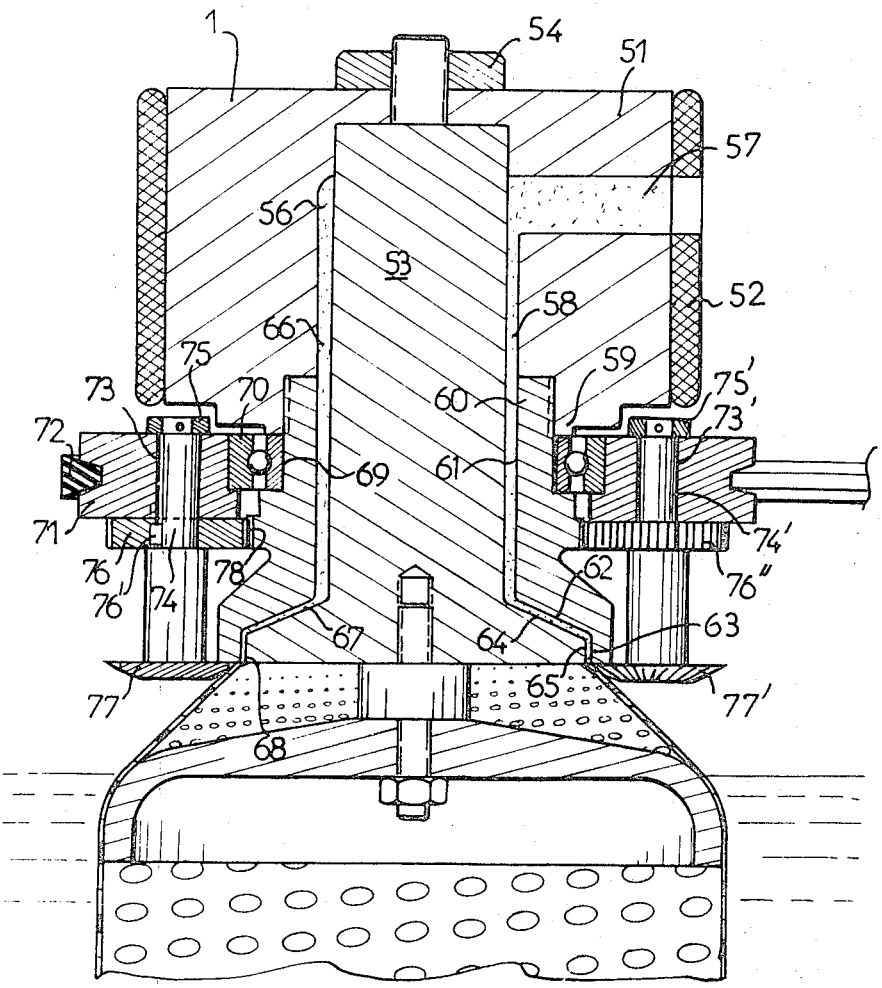
FIG. 7 is a diagrammatic axial section through an embodiment similar to that shown in FIG. 5, except that in this case the tooth wheels are situated outside the extruded sleeve.

The machine shown in FIG. 7 corresponds in principle to the machines described above, the only difference being that, in this case, the toothed wheels or rollers are situated outside the extruded sleeve. The rotatable perforating means includes elements 68–78, 74'–77' and 74".

A shaft 53 is mounted in a cylindrical block 51 equipped with heating means 52, being kept in position by a nut 54. This shaft 53 extends through a chamber 56 communicating with a radial bore 57 connected to an extruder (not shown) for delivery of the plastics material.

Below the chamber 56, the cylindrical block 51 has a bore 58 with a larger diameter than the shaft 53, and into the bottom 59 of this block is screwed a nut 60 formed with a hole 61 equal in diameter to the bore 58. The bore 61 extends downwards through a widened section 62, terminating in a cylindrical section situated opposite and at a slight distance from a widened wall 64 and a collar 65 on the lower end of the shaft 53.

The pasty plastics material coming from the extruder (not shown) enters the extrusion head 1 through the radial bore 57 and, after passing through the chambers 56, 66, 67, it leaves the extrusion head through the annular-slot 68.

A pulley wheel 71 is mounted on a cylindrical bearing surface 69 of the nut 60 by means of a ball bearing 70. A trapezoidal belt 72 travels around this pulley 71, rotating it about the shaft 53 by suitable means (not shown).

Bores 73, 73' are formed in the pulley 71 parallel to the shaft 53, axles 74, 74', kept in place by the nuts 75, 75', being freely mounted in these bores.

Below the pulley 71, the axles 74, 74' carry pinions 76, 76" which rotate with them by means of keys of which only the key 76' is shown. Toothed wheels or rollers 77, 77' whose teeth penetrate the sheets of plastics material issuing through the extrusion slot or die 68, are fixed by suitable means (not shown) to that end of the axles 74, 74' opposite to the end carrying the nuts 75, 75' or are integral with the axles 74, 74'. The pitch circle of the pinions 76, 76 forms a tangent to the extension of the outer wall or inner wall of the sleeve extruded through the annular extrusion slot 68, or to the extension of the central cylindrical surface of the aforementioned sleeve.

Finally, the nut 60 is provided at the level of the pinions 76, 76" with a toothed ring 78 with which these pinions mesh.

If, while the plastics material is issuing from the extrusion die 68, the pulley 71 is rotated, the wheels rotate about the shaft 53 and, at the same time, about their respective axes 74, 74" and, in doing so, form in the extruded tubular sheet of plastics material perforations which are aligned along a helical path and which are subsequently enlarged during the subsequent transverse and/or longitudinal drawing to which the extruded tubular sheet is subjected in known manner, to form a tubular network whose mesh pattern is governed by both the shape of the teeth of the wheels and by the conditions under which the tubular sheet is drawn. However, the mesh pattern can also be modified by changing the speed of rotation of the wheels 77, 77' about their own axes, for example by using pinions 76, 76" with a greater or lesser diameter.

Naturally, the pulley 71 comprises more than two wheel assemblies 77, 77', although the others have not been shown in the interests of clarity.

As already mentioned, the tubular network described above is made from a plastics material, preferably from a thermoplastic material, in particular PVC, polyethylene or polypropylene for example, although this list is by no means complete. In fact, it is possible to use any plastics material which can be converted into a paste in the extruder and which allows the tubular perforated network obtained to harden by passage through a bath of cooling water following the extrusion head in conventional manner.

I claim:

1. In a machine for producing a tubular perforated sleeve by extrusion of plastic material of the type having a cylindrical extrusion head having an annular slot for forming a solid-walled tubular sleeve during use, and means for enlarging perforations by at least one of transverse or longitudinal drawing of the sleeve, wherein the improvement comprises means for perforating the sleeve comprising at least one toothed roller mounted for rotation about an axis parallel to and spaced from the longitudinal axis of the cylindrical extrusion head in that the roller teeth penetrate through the tubular sleeve after the sleeve has issued from the extrusion head, means mounting said roller for rotation about the longitudinal axis of the extrusion head and means for effecting rotation of said roller about both the longitudinal axis of the extrusion head and its axis of rotation to perforate the sleeve with the rotating teeth.

2. A machine as claimed in claim 1, wherein said means mounting said roller comprises a shaft journalled on the axis of the extrusion head and a support member integral with the shaft on which said roller is rotationally mounted.

3. A machine as claimed in claim 2, wherein said shaft is mounted for axial displacement in the extrusion head from a position in which the roller is not in contact with the extruded sleeve into a position in which the roller bears against the annular extrusion slot with the peripheral teeth extending through the annular slot.

4. A machine as claimed in claim 1, wherein said means for effecting rotation comprises pinion means for positively rotating the roller about its axis.

5. A machine as claimed in claim 1, wherein said roller has identical teeth having a rectangular configuration.

6. A machine as claimed in claim 1, wherein said roller has identical teeth having a pointed configuration.

7. A machine as claimed in claim 1, including a plurality of rollers, at least one having rectangular teeth and at least one having pointed teeth with a rectangular toothed roller alternating with a pointed toothed roller.

8. A machine as claimed in claim 1, wherein the roller is disposed at the level of the opening of the extrusion slot, and wherein the means for effecting rotation comprises a pinion having a pitch circle which is tangential to the extension of the outer and inner face of the extrusion slot and to the extension of the central cylindrical surface passing through the extrusion slot.

9. A machine as claimed in claim 8, wherein the at least one roller is integral in rotation with the pinion, and wherein a fixed toothed ring meshes with the pinion.

10. A machine according to claim 9, wherein the roller and pinion, together with the toothed ring are situated inside the tubular sleeve.

11. A machine according to claim 9, wherein the roller and pinion, together with the toothed ring are situated outside the tubular sleeve.

12. A machine as claimed in claim 1, wherein the roller has one circumferential section with no teeth.

13. In a machine for perforating an extruded tubular workpiece of the type having an extrusion head having an annular extruding slot for extruding a solid walled tubular workpiece during use, wherein the improvement comprises rotatable perforating means mounted adjacent said extrusion head for rotation around the circumference of the extruded workpiece for perforating said tube in response to the rotational movement of the rotatable perforating means.

14. In a machine according to claim 13, wherein said rotatable perforating means comprises at least one rotatably mounted toothed roller rotatable about an axis different from the longitudinal axis of the extruding slot and means mounting said roller in a perforating position wherein the teeth thereof penetrate the extruded workpiece during the rotation of the rotatable perforating means around the circumference of the extruded workpiece thereby effecting rotation of said roller about its axis of rotation.

15. A machine according to claim 14, wherein said means mounting said roller in said perforating position further comprises means mounting said roller for movement into and out of said perforating position.

16. A machine according to claim 14, wherein said rotatable perforating means further comprises means for positively driving said roller about its axis of rotation in response to the rotation thereof around the circumference of the extruded workpiece.

17. A machine according to claim 16, wherein said means for positively driving said roller comprises a shaft integrally connected to the axis of said roller, and a toother gear fixedly connected to said roller and rotatable therewith about axis of rotation and a pinion gear fixedly connected to the extrusion head and meshing with said toothed gear.

18. A machine according to claim 17, wherein said roller and said pinion gear are rotated around the outer circumference of the extruded workpiece.

19. A machine according to claim 17, wherein said roller and said pinion gear rotate about the inner circumference of the extruded workpiece.

20. A maching according to claim 14, wherein the roller teeth have a rectangular configuration.

21. A machine according to claim 14, wherein the roller teeth have a pointed configuration.

22. A machine according to claim 14, comprising a plurality of rollers wherein at least one has teeth having a rectangular configuration and at least one has teeth having a pointed configuration and wherein the two types of rollers are alternately positioned.

23. A machine according to claim 14, wherein said roller has a circumferential portion having no teeth.

24. A machine according to claim 14, wherein said means mounting said roller in said perforating position comprises a rotatably driven shaft having its longitudinal axis colinear with the longitudinal axis of the extrusion slot, a discal member coaxially mounted around said shaft and rotatable therewith and on which said roller is rotatably mounted and wherein the axis thereof is parallel to and spaced from the longitudinal axis of the extruding slot.

25. A machine according to claim 23, further comprising means mounting said shaft for displacement along its longitudinal axis to effect the movement of said roller into and out of said perforating position.

26. In a machine according to claim 13, wherein said rotatable perforating means rotates around the inner circumference of the extruded workpiece.

27. In a machine according to claim 13, wherein said rotatable perforating means rotates around the outer circumference of the extruded workpiece.

* * * * *